(12) United States Patent
Maeda et al.

(10) Patent No.: US 12,104,719 B2
(45) Date of Patent: Oct. 1, 2024

(54) ELEMENT JOINT AND MANUFACTURING METHOD THEREFOR

(71) Applicant: KOBE STEEL, LTD., Hyogo (JP)

(72) Inventors: Yasuhiro Maeda, Kobe (JP); Toru Hashimura, Kobe (JP); Taiki Yamakawa, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 221 days.

(21) Appl. No.: 17/286,924

(22) PCT Filed: Dec. 4, 2019

(86) PCT No.: PCT/JP2019/047352
§ 371 (c)(1),
(2) Date: Apr. 20, 2021

(87) PCT Pub. No.: WO2020/137387
PCT Pub. Date: Jul. 2, 2020

(65) Prior Publication Data
US 2021/0356058 A1   Nov. 18, 2021

(30) Foreign Application Priority Data

Dec. 28, 2018   (JP) .................. 2018-246668

(51) Int. Cl.
F16L 13/02      (2006.01)
F16L 13/007     (2006.01)
F16L 13/14      (2006.01)

(52) U.S. Cl.
CPC .......... F16L 13/147 (2013.01); F16L 13/007 (2013.01); F16L 13/02 (2013.01)

(58) Field of Classification Search
CPC .... F16L 13/147; F16L 13/007; B21D 39/046; B21D 39/206; B21D 39/04; F16B 2/04;
(Continued)

(56) References Cited

U.S. PATENT DOCUMENTS 2,695,446 A * 11/1954 Meyer .................. F16L 13/147
29/523
3,002,269 A * 10/1961 Hopkins .............. B21D 22/105
29/523
(Continued)

FOREIGN PATENT DOCUMENTS

JP   S51-133170 A   11/1976
JP   H09-192760 A    7/1997
(Continued)

OTHER PUBLICATIONS

The extended European search report issued by the European Patent Office on Aug. 8, 2022, which corresponds to European Patent Application No. 19901604.9-1103 and is related to U.S. Appl. No. 17/286,924.
(Continued)

*Primary Examiner* — Zachary T Dragicevich
*Assistant Examiner* — James A Linford
(74) *Attorney, Agent, or Firm* — Studebaker & Brackett PC

(57) ABSTRACT

The element joint is obtained by joining: a long pipe; a short pipe made of a quality of material having a strength equal to or higher than a strength of the long pipe; and a plate material made of a quality of material having a strength equal to or higher than a strength of the short pipe. In the element joint, at least one member of the long pipe and the short pipe includes a pipe-shaped portion, and the pipe-shaped portion of the one member is pipe-expanded and joined to the other member by press-fitting. The short pipe and the plate material are welded to each other.

3 Claims, 16 Drawing Sheets

(58) Field of Classification Search
CPC . F16B 9/07; Y10T 403/4924; Y10T 29/49968
See application file for complete search history.

(56) References Cited

U.S. PATENT DOCUMENTS

| | | | |
|---|---|---|---|
| 4,132,437 A * | 1/1979 | Green | F16L 27/04 |
| | | | 29/523 |
| 10,843,251 B2 | 11/2020 | Maeda et al. | |
| 2003/0111839 A1* | 6/2003 | Fraser | F16L 13/147 |
| | | | 285/258 |
| 2006/0022473 A1 | 2/2006 | Hansen | |
| 2009/0243313 A1 | 10/2009 | Handing et al. | |
| 2010/0289300 A1 | 11/2010 | Kokubo | |
| 2010/0295296 A1 | 11/2010 | Kawamata | |
| 2018/0015527 A1 | 1/2018 | Maeda et al. | |
| 2019/0210088 A1 | 7/2019 | Maeda et al. | |
| 2019/0210089 A1 | 7/2019 | Maeda et al. | |

FOREIGN PATENT DOCUMENTS

| | | |
|---|---|---|
| JP | 2005-152920 A | 6/2005 |
| JP | 2011-000620 A | 1/2011 |
| JP | 2016-147309 A | 8/2016 |
| WO | 2018/061684 A1 | 4/2018 |

OTHER PUBLICATIONS

International Search Report issued in PCT/JP2019/047352; mailed on Feb. 10, 2020.
International Preliminary Report On Patentability and Written Opinion issued in PCT/JP2019/047352; mailed on Jul. 8, 2021.

* cited by examiner

ELEMENT JOINT AND MANUFACTURING METHOD THEREFOR

CROSS-REFERENCE TO RELATED APPLICATIONS

This is a national phase application in the United States of International Patent Application No. PCT/JP2019/047352 with an international filing date of Dec. 4, 2019, which claims priority of Japanese Patent Application No. 2018-246668 filed on Dec. 28, 2018 the contents of which are incorporated herein by reference.

TECHNICAL FIELD

The present invention relates to an element joint and a method for manufacturing the element joint.

BACKGROUND ART

High strength steel sheets referred to as high tension steel are used to reduce weight and improve safety of vehicles. Although the high tension steel is effective in reducing weight and improving safety, the high tension steel is heavier than lower specific gravity material such as aluminum. In addition, when high tension steel is used, the high strength causes problems such as a decrease in formability, an increase in forming load, and a decrease in dimensional accuracy. In order to solve these problems, in recent years, multi-materialization in combination with steel parts and extrusion-molded products, cast products, or press-molded products that use aluminum having a lower specific gravity than steel has been used.

The problem with multi-materialization is the joining of dissimilar metals such as steel parts and aluminum parts. Generally, it is difficult to join dissimilar metals having different properties as described above, but, for example, JP S51-133170 A and JP H9-192760 A disclose methods for joining members of enabling dissimilar metals to be joined in multi-materialization with utilizing an elastic body. Specifically, in methods for joining members of JP S51-133170 A and JP H9-192760 A, a pipe body is inserted into a hole portion of a wall surface body (plate member), an elastic body (urethane rubber member) is inserted inside the pipe body (pipe member), and the elastic body is pressed to be deformed, whereby the pipe body is expanded, and the wall surface body and the pipe body are joined by press-fitting.

In the joining methods disclosed in JP S51-133170 A and JP H9-192760 A, it is considered that the strength of metal members becomes a problem when joining metal members having different properties. Specifically, when the low-strength member is pipe-expanded and joined to the high-strength member by press-fitting, the low-strength member may bite into the high-strength member and be damaged. In addition, when the high-strength member is pipe-expanded and joined to the low-strength member by press-fitting, it is difficult to pipe-expand the high-strength member from the viewpoint of formability. Furthermore, if machining force sufficient to deform the high-strength member is applied, the shape of the low-strength member is not maintained, and it is difficult to maintain the product shape. Therefore, in any case, there is room for improvement in joining accuracy.

The present invention has an object to join members having different strengths together with high accuracy, in an element joint and a method for manufacturing the element joint.

The first aspect of the present invention provides an element joint including joining of: a first member; a second member made of a quality of material having a strength equal to or higher than a strength of the first member; and a third member made of a quality of material having a strength equal to or higher than the strength of the second member. At least one member of the first member and the second member includes a pipe-shaped portion, and the pipe-shaped portion of the one member is pipe-expanded and joined to the other member by press-fitting. The second member and the third member are joined to each other by a mechanical joining method or a metallurgical joining method.

According to this configuration, when the first member made of a relatively low-strength quality of material and the third member made of a relatively high-strength quality of material are joined, the second member made of an intermediate strength quality of material is used. Here, the strength refers to mechanical strength, and for example, tensile strength and yield stress Specifically, the first member having a relatively low strength and the second member are joined by press-fitting with deformation, and the second member having a relatively high strength and the third member are joined by a mechanical joining method or a metallurgical joining method without deformation. Here, the mechanical joining method is a joining method in a broad sense including rivet joining and bolt joining, and excluding press-fitting. In addition, the metallurgical joining method is a joining method in a broad sense including welding and brazing joining. In particular, since there is no need to directly join the high-strength third member and the low-strength first member together by press-fitting, the third member does not bite into the first member and damage to the first member can be prevented. In addition, since there is no need to caulk and join the third member, there is no need to deform the high-strength third member difficult to deform, either. Therefore, since there is also no need to apply machining force sufficient to deform the high-strength third member, the shape of the low-strength first member can also be maintained and the product shape can be maintained.

Six specific configuration examples of these element joints are shown in (1) to (6) below.

(1) Both the first member and the second member may have a pipe shape. The third member may have a plate shape including a hole portion. The first member may be inserted into the second member, may be pipe-expanded, and may be joined to the second member by press-fitting. The second member may be inserted into the hole portion of the third member, and may be joined to the hole portion of the third member by a mechanical joining method or a metallurgical joining method.

(2) The first member may have a pipe shape. The second member may include a pipe-shaped portion and a flange portion extending radially outward from the pipe-shaped portion. The third member may include a flat portion opposite the flange portion. The first member may be inserted into the pipe-shaped portion of the second member, may be pipe-expanded with respect to the pipe-shaped portion, and may be joined to the second member by press-fitting. The flange portion of the second member and the flat portion of the third member may be joined by a mechanical joining method or a metallurgical joining method.

(3) The first member may have a plate shape including a hole portion. Both the second member and the third member may have a pipe shape. The third member may be inserted into the second member, may be pipe-expanded, and may be joined to the second member by press-fitting. The second member may be inserted into the hole portion of the first member, and may be joined to the hole portion of the first member by a mechanical joining method or a metallurgical joining method.

(4) The third member may have a pipe shape. The second member may include a pipe-shaped portion and a flange portion extending radially outward from the pipe-shaped portion. The first member may include a flat portion opposite the flange portion. The third member may be inserted into the pipe-shaped portion of the second member, may be pipe-expanded with respect to the pipe-shaped portion, and may be joined to the second member by press-fitting. The flange portion of the second member and the flat portion of the first member may be joined by a mechanical joining method or a metallurgical joining method.

(5) The first member may include a pair of plate-shaped opposite side walls, and each of the pair of side walls may be provided with a hole portion. Both the second member and the third member may have a pipe shape. The second member may be inserted into each of the hole portions of the pair of side walls of the first member, may be pipe-expanded with respect to each of the hole portions, and may be joined to the first member by press-fitting. The third member may be inserted into the second member and may be joined to an end portion of the second member by a mechanical joining method or a metallurgical joining method.

(6) Both The first member and the second member may have a pipe shape. The third member may include a pair of side walls facing each other, and each of the pair of side walls may be provided with a hole portion. The second member may be inserted into each of the hole portions of the pair of side walls of the third member, and may be joined to the third member at each of the hole portions by a mechanical joining method or a metallurgical joining method. The first member may be inserted into the second member, may be pipe-expanded with respect to each of the hole portions of the pair of side walls, and may be joined to the second member by press-fitting.

In addition, the first member may be a bumper stay, and the third member may be a bumper beam.

According to this configuration, it is possible to provide a bumper system as a vehicle structural member using an element joint joined with high accuracy.

The first member may be made of a quality of material having a tensile strength of 400 MPa or less. The second member may be made of a quality of material having a tensile strength of 400 to 1000 MPa. The third member may be made of a quality of material having a tensile strength of 1000 MPa or more.

According to this configuration, the first member and the third member have a strength difference of at least 600 MPa or more in terms of tensile strength. Therefore, the second member can be effectively used for the first member and the third member having such a large strength difference, and highly accurate joining can be achieved.

The second aspect of the present invention provides a method for manufacturing an element joint by joining: a first member, a second member made of a quality of material having a strength equal to or higher than a strength of the first member, and a third member made of a quality of material having a strength equal to or higher than the strength of the second member, the method including: preparing the first member and the second member at least one of which includes a pipe-shaped portion, and the third member; pipe-expanding the pipe-shaped portion to join the pipe-shaped portion to the other member by press-fitting; and joining the second member and the third member to each other by a mechanical joining method or a metallurgical joining method.

According to this method, it is possible to manufacture an element joint in which the first member, the second member, and the third member having different strengths are joined with high accuracy as described above.

The joining by press-fitting may include: inserting an elastic body into the pipe-shaped portion, and compressing the elastic body in a longitudinal direction of the pipe-shaped portion to expand the elastic body radially outward from the pipe-shaped portion to pipe-expand the pipe-shaped portion radially outward to join the pipe-shaped portion to the other member by press-fitting.

According to this method, highly accurate joining by press-fitting can be easily achieved by what is called rubber bulge processing.

According to the present invention, in an element joint and a method for manufacturing the element joint, the first member and the third member having different strengths can be joined with high accuracy by using the second member having an intermediate strength.

MODE FOR CARRYING OUT THE INVENTION

Hereinafter, an element joint and a method for manufacturing the same according to each embodiment of the present invention will be described in detail with reference to the drawings.

The element joint is used as a joint of structural members in various structural bodies such as vehicles. Therefore, reliability is required for element joints. The reliability of element joints is greatly affected by the material properties of the members to be joined, and it is necessary to consider the material strength of the members to be joined in particular. In each of the following embodiments, various joining modes will be described depending on the material strength, but each embodiment merely shows one example of the present invention, and it is not intended to limit the present invention, its application, or its use.

First Embodiment

Figure 1:
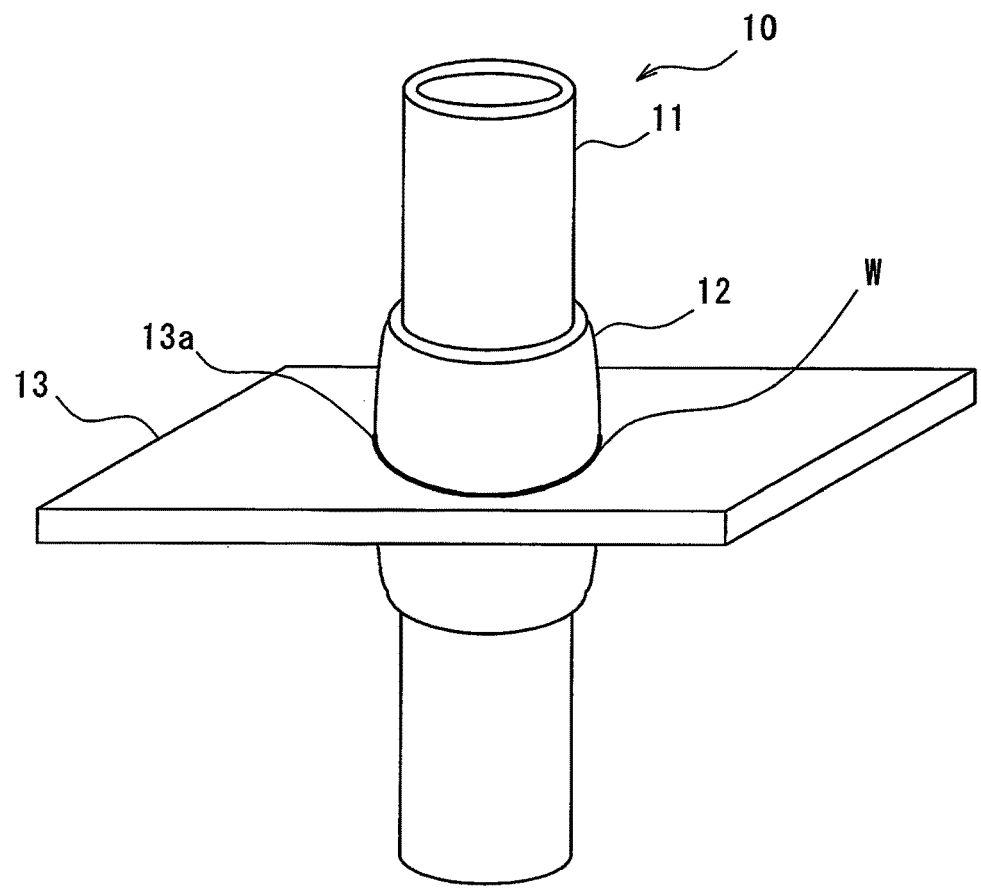
FIG. 1 is a perspective view of an element joint according to a first embodiment.

With reference to FIG. 1, the element joint 10 of the present embodiment is obtained by joining a long pipe (first member) 11 made of a quality of material with the lowest strength, a short pipe (second member) 12 made of a quality of material with intermediate strength, and a plate material (third member) 13 made of a quality of material with the highest strength.

The strength refers to mechanical strength, and for example, tensile strength and yield stress. Hereinafter, the tensile strength will be described as an example. In addition, the intermediate strength means the strength equal to or higher than the strength of the long pipe (first member) 11 and equal to or lower than the strength of the plate material (third member) 13. That is, the short pipe (second member) 12 may have the same quality of material as the long pipe (first member) 11 or the plate material (third member) 33. These also apply to the following embodiments.

The long pipe 11 has a circular-pipe shape thinner and longer than the short pipe 12. That is, the entire long pipe 11 is a pipe-shaped portion. The long pipe 11 is made of, for example, an aluminum alloy. The tensile strength of the aluminum alloy is about 400 MPa or less.

The short pipe 12 has a circular-pipe shape having a large diameter and a short length to the extent that the long pipe 11 can be inserted. That is, the entire short pipe 12 is a pipe-shaped portion. The short pipe 12 is made of, for example, mild steel or high tension steel. The tensile strength of mild steel and high tension steel is about 400 to 1000 MPa.

The plate material 13 includes a hole portion 13a having a size into which the short pipe 12 can be inserted. The plate material 13 is made of, for example, ultra-high tension steel. The tensile strength of ultra-high tension steel is about 1000 to 1700 MPa. The plate material 13 is made of, for example, ultra-high tension steel. The tensile strength of ultra-high tension steel is about 1000 to 1700 MPa.

In the element joint 10 of the present embodiment, the long pipe 11 is inserted into the short pipe 12, and the long pipe 11 is pipe-expanded and joined to the short pipe 12 by press-fitting. In addition, the short pipe 12 is inserted into the hole portion 13a of the plate material 13 and is joined to the hole portion 13a of the plate material 13 by a mechanical joining method or a metallurgical joining method. The mechanical joining method is a joining method in a broad sense including rivet joining and bolt joining, and excluding press-fitting. The metallurgical joining method is a joining method in a broad sense including welding and brazing joining. In the present embodiment, the short pipe 12 is welded to the hole portion 13a of the plate material 13 (see reference numeral W). Welding is performed circumferentially along the edge of the hole portion 13a.

A method for manufacturing the element joint 10 described above will be described with reference to FIGS. 2A to 2F.

Figure 2A:
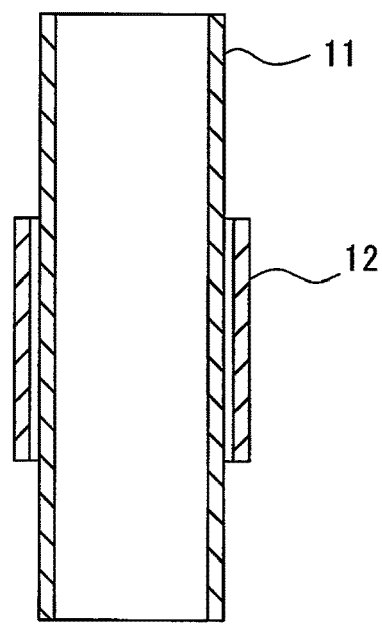
FIG. 2A is a cross-sectional view showing a first step of a method for manufacturing the element joint according to the first embodiment.

With reference to FIG. 2A, the long pipe 11 is inserted into the short pipe 12.

Figure 2B:
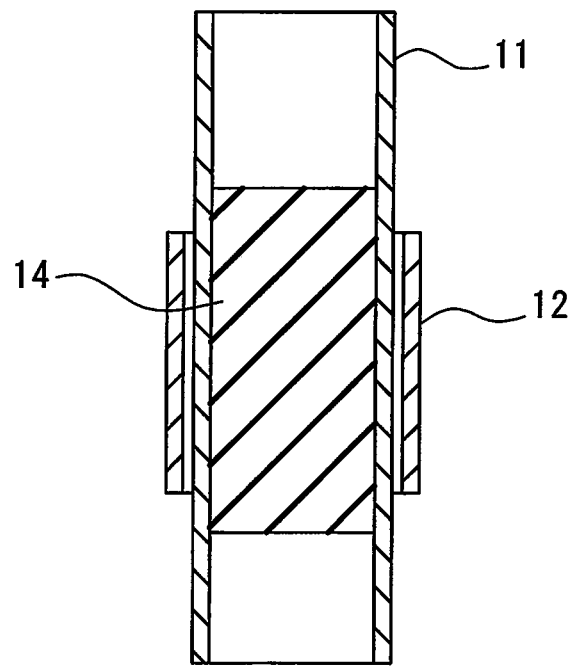
FIG. 2B is a cross-sectional view showing a second step of the method for manufacturing the element joint according to the first embodiment.

With reference to FIG. 2B, a columnar rubber member (elastic body) 14 is inserted into the long pipe 11. As a quality of material of the rubber member 14, for example, it is preferable to use any one of urethane rubber, chloroprene rubber, CNR rubber (chloroprene rubber+nitrile rubber), or silicone rubber. In addition, the hardness of the rubber member 14 is preferably 30 or more in Shore A.

Any one of the step shown in FIG. 2A and the step shown in FIG. 2B may be executed first.

Figure 2C:
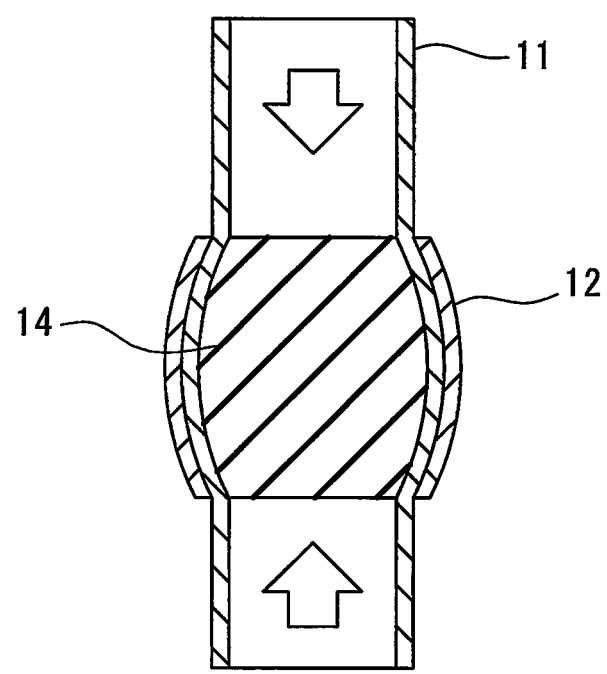
FIG. 2C is a cross-sectional view showing a third step of the method for manufacturing the element joint according to the first embodiment.

With reference to FIG. 2C, the rubber member 14 is compressed in the longitudinal direction of the long pipe 11 and expanded radially outward from the long pipe 11, whereby the long pipe 11 is pipe-expanded radially outward and joined to the short pipe 12 by press-fitting.

Figure 2D:
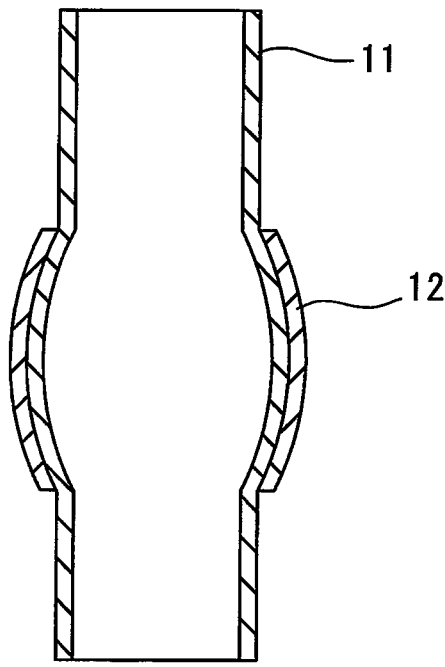
FIG. 2D is a cross-sectional view showing a fourth step of the method for manufacturing the element joint according to the first embodiment.

With reference to FIG. 2D, removal of the compressive load on the rubber member 14 restores the rubber member 14 to its natural state (original columnar shape). At this time, the long pipe 11 is plastically deformed and its shape is maintained. Therefore, the rubber member 14 can be easily removed from the long pipe 11. It should be noted that in the present embodiment, the short pipe 12 is also plastically deformed similarly to the long pipe 11.

Figure 2E:
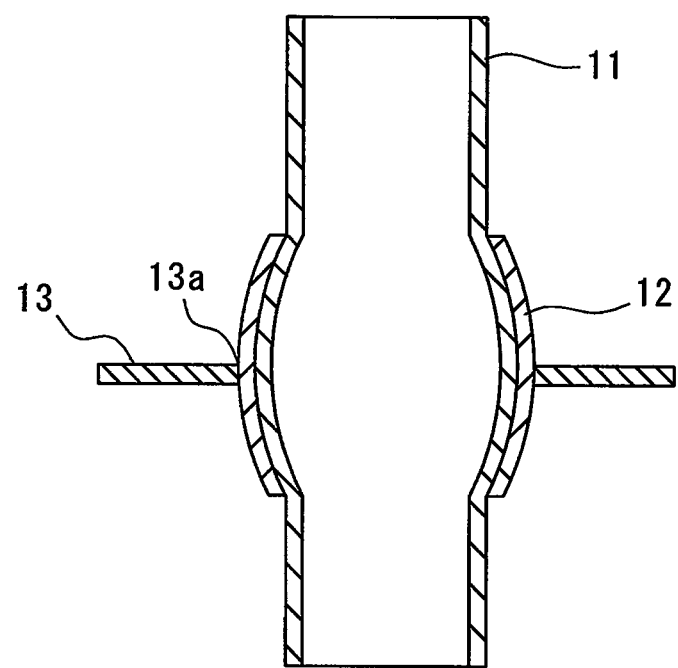
FIG. 2E is a cross-sectional view showing a fifth step of the method for manufacturing the element joint according to the first embodiment.

With reference to FIG. 2E, the long pipe 11 and the short pipe 12 joined by press-fitting are inserted together into the hole portion 13a of the plate material 13. At this time, the pipe-expanded portions of the long pipe 11 and the short pipe 12 are arranged so as to be positioned in the hole portion 13a. Preferably, in a plan view, the pipe-expanded portion of the short pipe 12 abuts on the hole portion 13a of the plate material 13. That is, the short pipe 12 is arranged without a gap with respect to the hole portion 13a of the plate material 13 so as to be easily welded later.

Figure 2F:
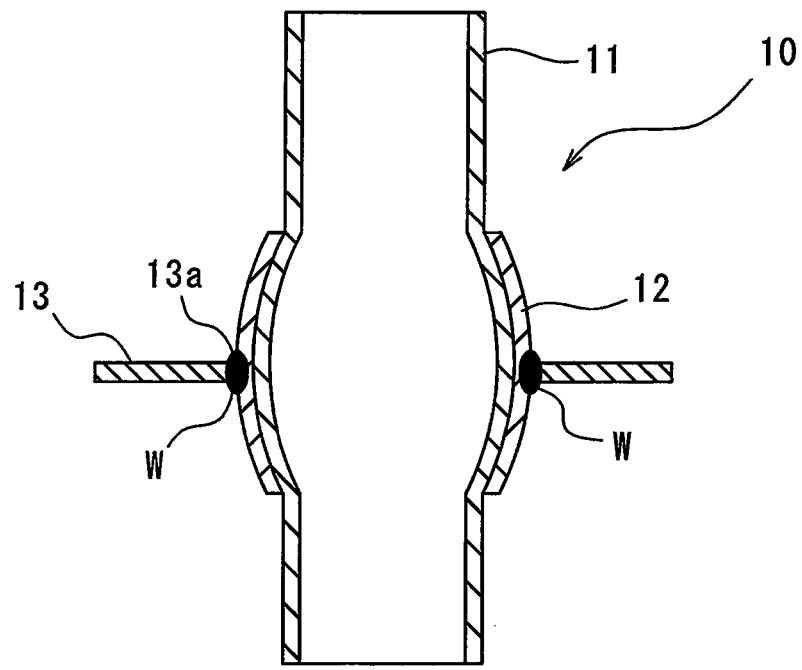
FIG. 2F is a cross-sectional view showing a sixth step of the method for manufacturing the element joint according to the first embodiment.

The short pipe 12 and the plate material 13 are welded with reference to FIG. 2F. Welding is performed circumferentially along the hole portion 13a of the plate material 13 (see reference numeral W). However, it is not always necessary to weld circumferentially, and any portion may be welded. Modes of welding adopt various types such as laser, arc, or spot. In addition, instead of welding, brazing, rivet joining, or bolt joining may be adopted. For rivet joining, self-piercing rivet (SPR) or blind rivet may be adopted. In addition, flow drill screw (FDS) may be adopted.

In this way, the element joint 10 of the present embodiment is manufactured as shown in FIG. 2F.

According to the present embodiment, when a long pipe 11 made of a relatively low-strength quality of material and a plate material 13 made of a relatively high-strength quality of material are joined, a short pipe 12 made of an intermediate-strength quality of material is used. In addition, the intermediate-strength quality of material includes the same quality of material as the lowest strength quality of material or the highest strength quality of material. Since the long pipe 11 and the plate material 13 are joined via the short pipe 12, the long pipe 11 and the short pipe 12 with different strengths are not directly joined, and it is possible to provide an element joint that can be multi-materialized and that achieves highly accurate joining. Specifically, the long pipe 11 having a relatively low strength and the short pipe 12 are joined by press-fitting with deformation, and the short pipe 12 having a relatively high strength and the plate material 13 are joined by welding without major deformation. In particular, since there is no need to directly join the high-strength plate material 13 and the low-strength long pipe 11 together by press-fitting, the plate material 13 does not bite into the long pipe 11 and damage to the long pipe 11 can be prevented. In addition, since there is no need to caulk and join the plate material 13, there is no need to deform the high-strength plate material 13 difficult to deform, either. Therefore, since there is also no need to apply machining force sufficient to deform the high-strength plate material 13, the shape of the low-strength long pipe 11 can also be maintained and the product shape can be maintained.

In addition, the long pipe 11 and the plate material 13 have a strength difference of at least 600 MPa or more in terms of tensile strength. Therefore, the short pipe 12 can be effectively used for the long pipe 11 and the plate material 13 having such a large strength difference, and highly accurate joining can be achieved.

In the present embodiment, the case where both the long pipe 11 and the short pipe 12 are circular pipe-shaped is described as an example, but the shapes of the long pipe 11 and the short pipe 12 are not particularly limited. For example, the cross-sectional shape of the long pipe 11 and the short pipe 12 can be any polygon or the like other than a circular shape. In addition, although what is called rubber bulge processing using a rubber member 14 is adopted as a pipe-expanding method for press-fitting, electromagnetic forming processing, hydroforming processing, or the like may be adopted in addition to this. These are the same in each of the following embodiments.

Second Embodiment

FIGS. 3A to 3F show a method for manufacturing the element joint 10 of the present embodiment correspondingly to FIGS. 2A to 2F of the first embodiment. In the present embodiment, the description of substantially the same parts as in the first embodiment may be omitted.

The element joint 20 of the present embodiment is obtained by joining a pipe (first member) 21 made of the lowest strength quality of material, a pedestal (second member) 22 made of an intermediate strength quality of material, and a plate material (third member) 23 made of the highest strength quality of material.

The pipe 21 has a circular-pipe shape thinner and longer than the pipe-shaped portion 22a of the pedestal 22. The pipe 21 is made of, for example, an aluminum alloy. The tensile strength of the aluminum alloy is about 400 MPa or less.

The pedestal 22 includes a pipe-shaped portion 22a having a short circular-pipe shape with a diameter large enough for the pipe 21 to be inserted into, and a flange portion 22b extending radially outward from the pipe-shaped portion 22a. The pedestal 22 is made of, for example, mild steel or high tension steel. The tensile strength of mild steel and high tension steel is about 400 to 1000 MPa.

Unlike the first embodiment, the plate material 23 does not include a hole portion 13a (see FIG. 2F), but includes a flat portion 23a facing the flange portion 22b. The plate material 23 is made of, for example, ultra-high tension steel. The tensile strength of ultra-high tension steel is about 1000 to 1700 MPa.

Figure 3A:
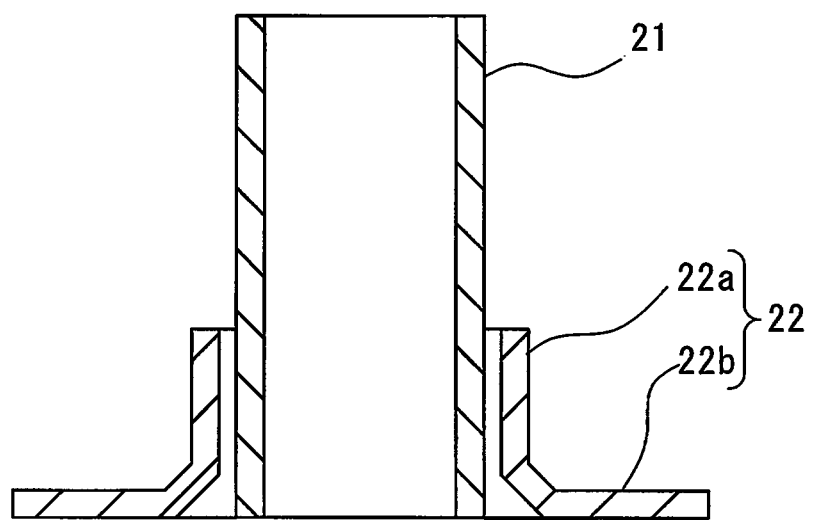
FIG. 3A is a cross-sectional view showing a first step of a method for manufacturing an element joint according to a second embodiment.
Figure 3B:
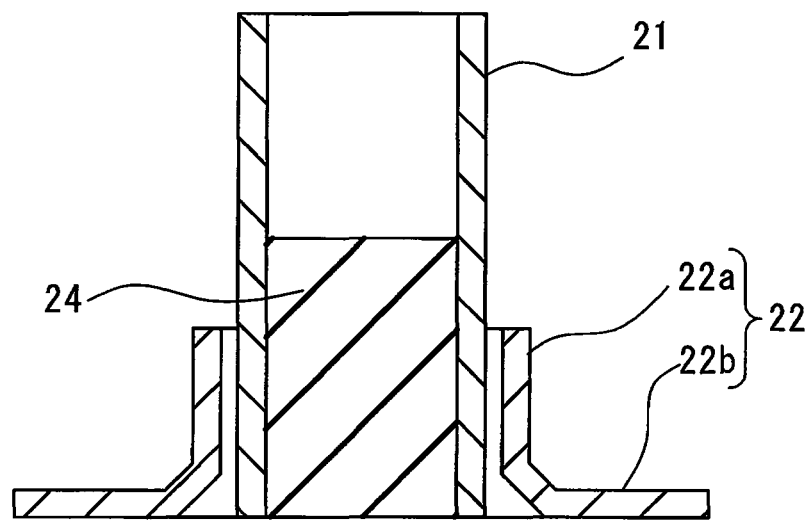
FIG. 3B is a cross-sectional view showing a second step of the method for manufacturing the element joint according to the second embodiment.
Figure 3C:
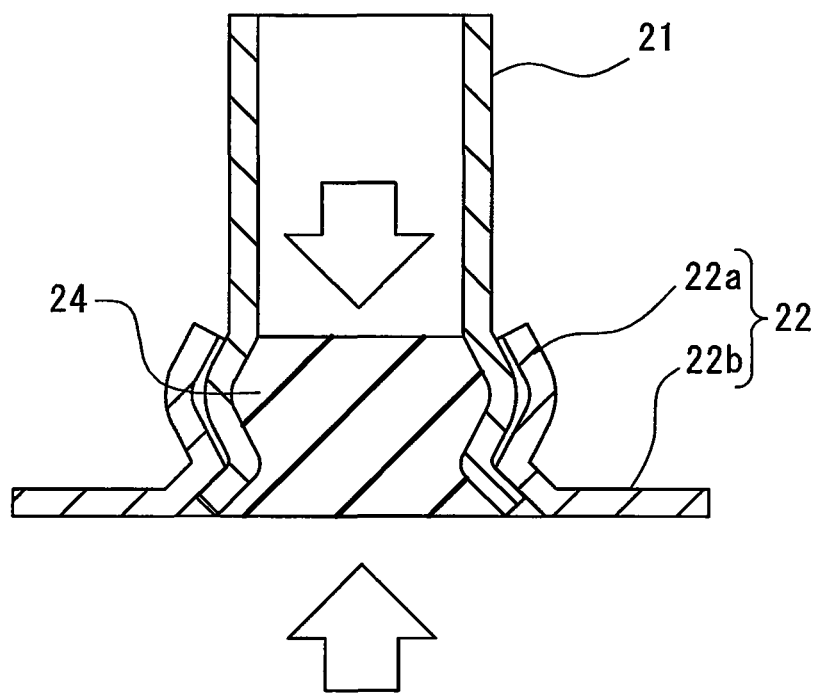
FIG. 3C is a cross-sectional view showing a third step of the method for manufacturing the element joint according to the second embodiment.
Figure 3D:
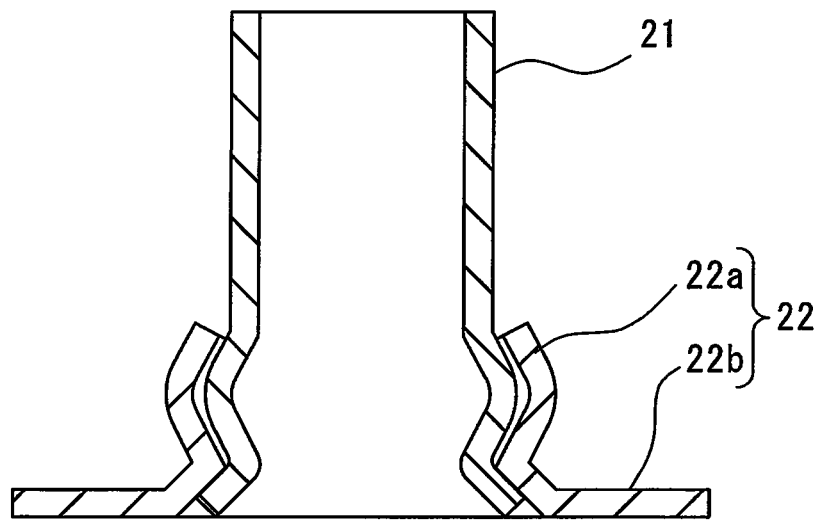
FIG. 3D is a cross-sectional view showing a fourth step of the method for manufacturing the element joint according to the second embodiment.
Figure 3E:
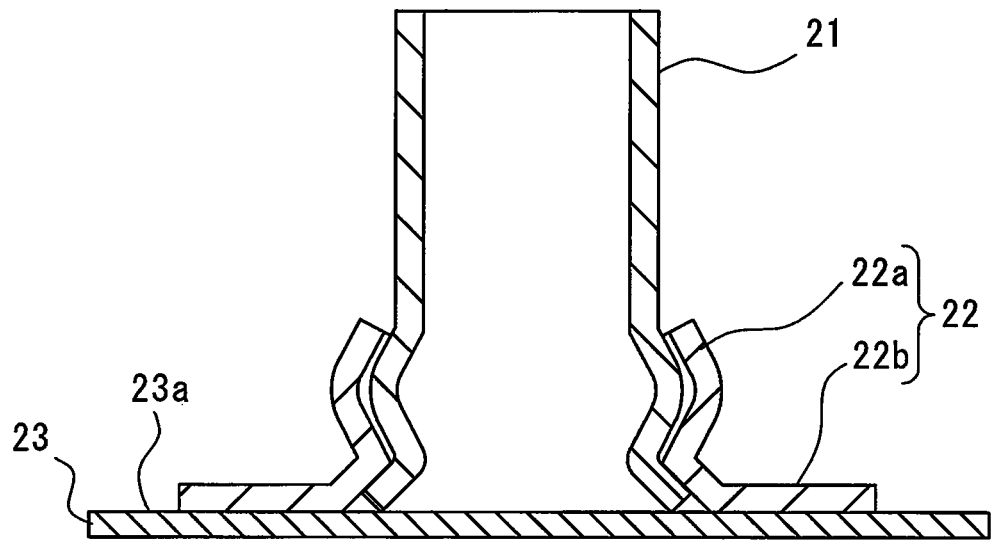
FIG. 3E is a cross-sectional view showing a fifth step of the method for manufacturing the element joint according to the second embodiment.
Figure 3F:
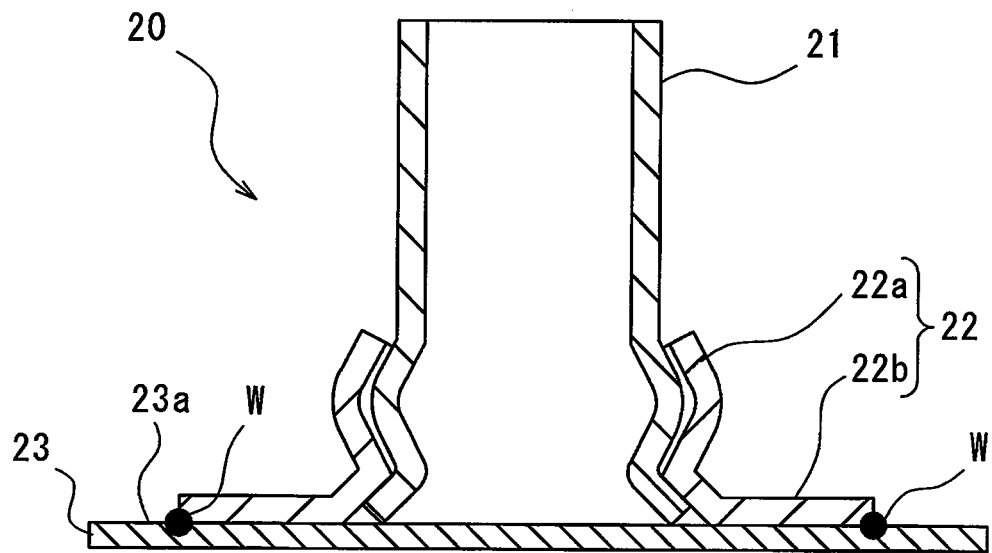
FIG. 3F is a cross-sectional view showing a sixth step of the method for manufacturing the element joint according to the second embodiment.

With reference to FIG. 3F, in the element joint 20 of the present embodiment, the pipe 21 is inserted into the pipe-shaped portion 22a of the pedestal 22, and the pipe 21 is pipe-expanded and joined to the pipe-shaped portion 22a of the pedestal 22 by press-fitting. In addition, the flange portion 22b of the pedestal 22 is arranged to overlap with the flat portion 23a of the plate material 23 and is welded to the flat portion 23a of the plate material 23 (see reference numeral W). It should be noted that similarly to the first embodiment, a metallurgical joining method or a mechanical joining method other than welding may be adopted.

A method for manufacturing the element joint 20 described above will be described with reference to FIGS. 3A to 3F.

With reference to FIG. 3A, the pipe 21 is inserted into the pipe-shaped portion 22a of the pedestal 22.

With reference to FIG. 3B, a columnar rubber member (elastic body) 24 is inserted into the pipe 21.

Any one of the step shown in FIG. 3A and the step shown in FIG. 3B may be executed first.

With reference to FIG. 3C, the rubber member 24 is compressed in the longitudinal direction of the pipe 21 and expanded radially outward from the pipe 21, whereby the pipe 21 is pipe-expanded radially outward and joined to the pipe-shaped portion 22a of the pedestal 22 by press-fitting.

With reference to FIG. 3D, removal of the compressive load on the rubber member 24 restores the rubber member 24 to its natural state (original columnar shape). At this time, the pipe 21 is plastically deformed and its shape is maintained. Therefore, the rubber member 24 can be easily removed from the pipe 21. It should be noted that in the present embodiment, the pipe-shaped portion 22a of the pedestal 22 is also plastically deformed similarly to the long pipe 21.

With reference to FIG. 3E, the flange portion 22b of the pedestal 22 is arranged to overlap with the flat portion 23a of the plate material 23. The flange portion 22b and the flat portion 23a have a flat surface parallel to each other and abut on the flat surface.

With reference to FIG. 3F, the flange portion 22b of the pedestal 22 and the flat portion 23a of the plate material 23 are welded. Welding is performed circumferentially along the edge of the flange portion 22b of the plate material 23 (see reference numeral W).

In this way, the element joint 20 of the present embodiment is manufactured as shown in FIG. 3F.

The action and effect of the present embodiment are the same as those of the first embodiment.

Third Embodiment

Figure 4:
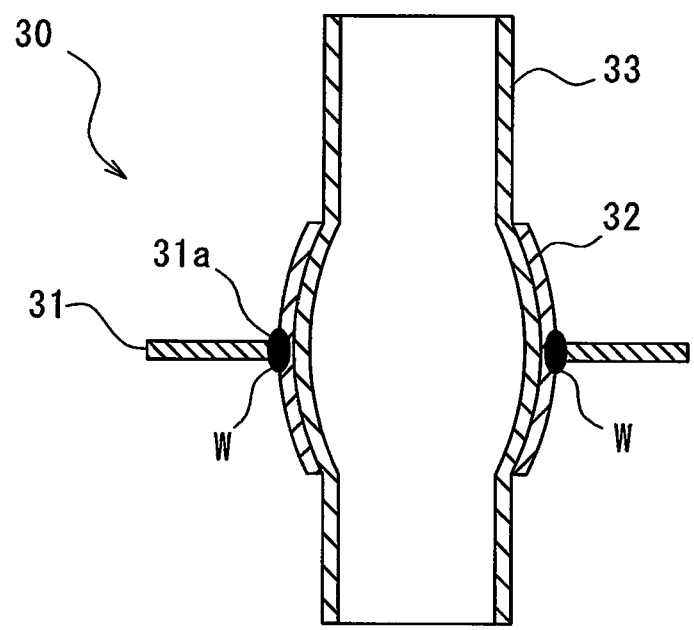
FIG. 4 is a cross-sectional view of an element joint according to a third embodiment.

FIG. 4 shows an element joint 30 of the present embodiment correspondingly to FIG. 2F of the first embodiment. In the present embodiment, the description of substantially the same parts as in the first embodiment may be omitted.

The element joint 30 of the present embodiment is obtained by joining a plate material (first member) 31 made of a quality of material with the lowest strength, a short pipe (second member) 32 made of a quality of material with intermediate strength, and a long pipe (third member) 33 made of a quality of material with the highest strength.

The plate material 31 includes a hole portion 31a having a size into which the short pipe 32 can be inserted. The plate material 31 is made of, for example, an aluminum alloy. The tensile strength of the aluminum alloy is about 400 MPa or less.

The short pipe 32 has a circular-pipe shape having a large diameter and a short length to the extent that the long pipe 33 can be inserted. That is, the entire short pipe 32 is a pipe-shaped portion. The short pipe 32 is made of, for example, an aluminum alloy. The tensile strength of the aluminum alloy is about 400 MPa or less.

The long pipe 33 has a circular-pipe shape thinner and longer than the short pipe 32. That is, the entire long pipe 33 is a pipe-shaped portion. The long pipe 33 is made of, for example, mild steel or high tension steel. The tensile strength of mild steel and high tension steel is about 400 to 1000 MPa.

In the element joint 30 of the present embodiment, the long pipe 33 is inserted into the short pipe 32, and the long pipe 33 is pipe-expanded and joined to the short pipe 32 by press-fitting. In addition, the short pipe 32 is inserted into the hole portion 31a of the plate material 31 and is welded to the hole portion 31a of the plate material (see reference numeral W). It should be noted that similarly to the first embodiment, a metallurgical joining method or a mechanical joining method other than welding may be adopted.

The method for manufacturing the element joint 30 of the present embodiment is substantially the same as that of the first embodiment. In addition, the action and effect of the present embodiment are also the same as those of the first embodiment.

Fourth Embodiment

Figure 5:
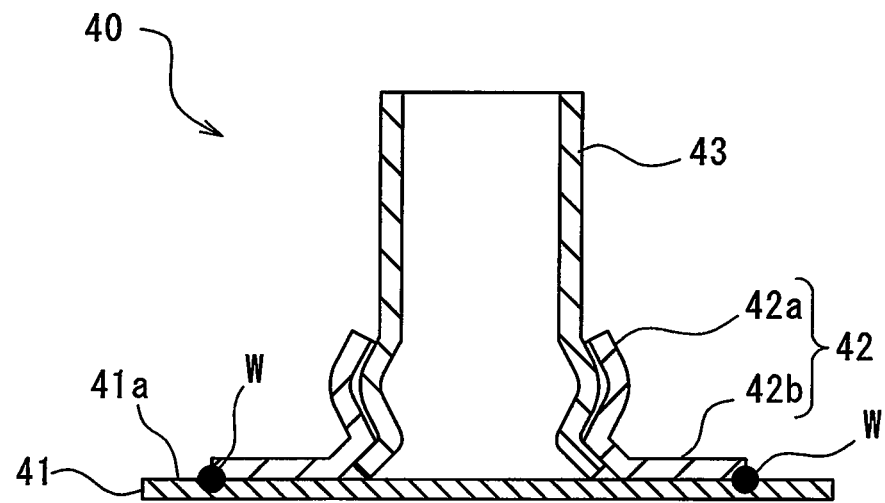
FIG. 5 is a cross-sectional view of an element joint according to a fourth embodiment.

FIG. 5 shows an element joint 40 of the present embodiment correspondingly to FIG. 3F of the second embodiment. In the present embodiment, the description of substantially the same parts as in the second embodiment may be omitted.

The element joint 40 of the present embodiment is obtained by joining a plate material (first member) 41 made of the lowest strength quality of material, a pedestal (second member) 42 made of an intermediate strength quality of material, and a pipe (third member) 43 made of the highest strength quality of material.

The plate material 41 includes a flat portion 41a facing the flange portion 42b. The plate material 41 is made of, for example, an aluminum alloy. The tensile strength of the aluminum alloy is about 400 MPa or less.

The pedestal 42 includes a pipe-shaped portion 42a having a short circular-pipe shape with a diameter large enough for the pipe 43 to be inserted into, and a flange portion 42b extending radially outward from the pipe-shaped portion 42a. The pedestal 42 is made of, for example, an aluminum alloy. The tensile strength of mild steel and high tension steel is about 400 MPa or less.

The pipe 43 has a circular-pipe shape thinner and longer than the pipe-shaped portion 42a of the pedestal 42. The pipe 43 is made of, for example, mild steel or high tension steel. The tensile strength of mild steel and high tension steel is about 400 to 1000 MPa.

The plate material 41 includes a flat portion 41a facing the flange portion 42b. The plate material 41 is made of, for example, mild steel or high tension steel. The tensile strength of mild steel and high tension steel is about 400 to 1000 MPa.

In the element joint 40 of the present embodiment, the pipe 43 is inserted into the pipe-shaped portion 42b of the pedestal 42, and the pipe 43 is pipe-expanded and joined to the pipe-shaped portion 42b of the pedestal 42 by press-fitting. In addition, the flange portion 42b of the pedestal 42 is arranged to overlap with the flat portion 41a of the plate material 41 and is welded to the flat portion 41a of the plate material 41 (see reference numeral W). It should be noted that similarly to the first embodiment, a metallurgical joining method or a mechanical joining method other than welding may be adopted.

The method for manufacturing the element joint 40 of the present embodiment is substantially the same as that of the second embodiment. In addition, the action and effect of the present embodiment are also the same as those of the first embodiment.

Fifth Embodiment

FIGS. 6A to 6F show a method for manufacturing the element joint 50 of the present embodiment correspondingly to FIGS. 2A to 2F of the first embodiment. In the present embodiment, the description of substantially the same parts as in the first embodiment may be omitted.

Figure 6A:
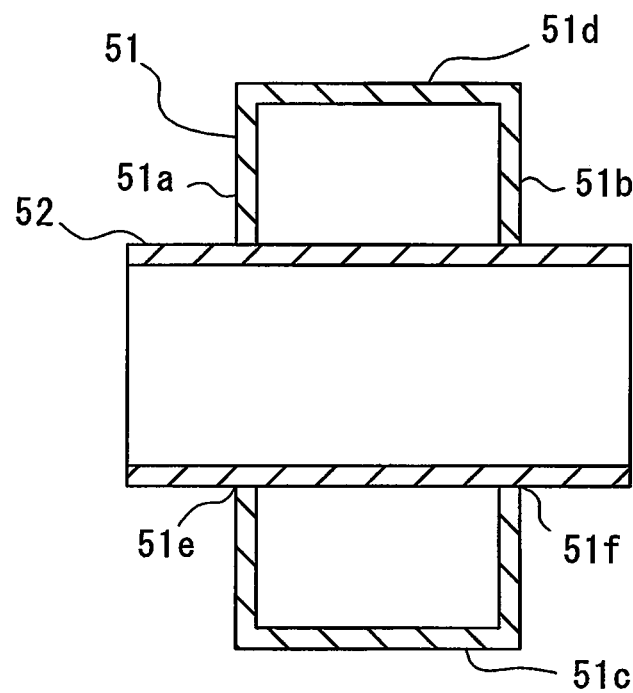
FIG. 6A is a cross-sectional view showing a first step of a method for manufacturing an element joint according to a fifth embodiment.
Figure 6B:
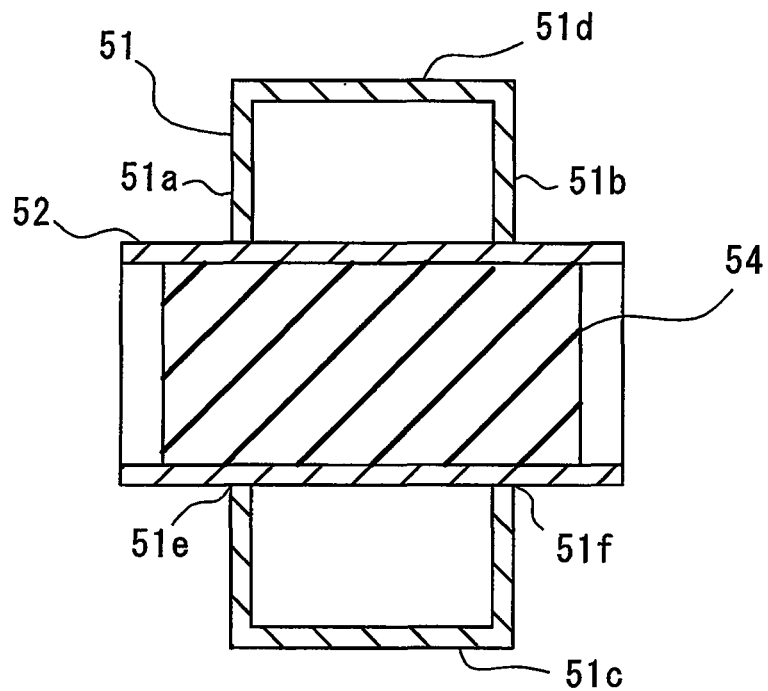
FIG. 6B is a cross-sectional view showing a second step of the method for manufacturing the element joint according to the fifth embodiment.
Figure 6C:
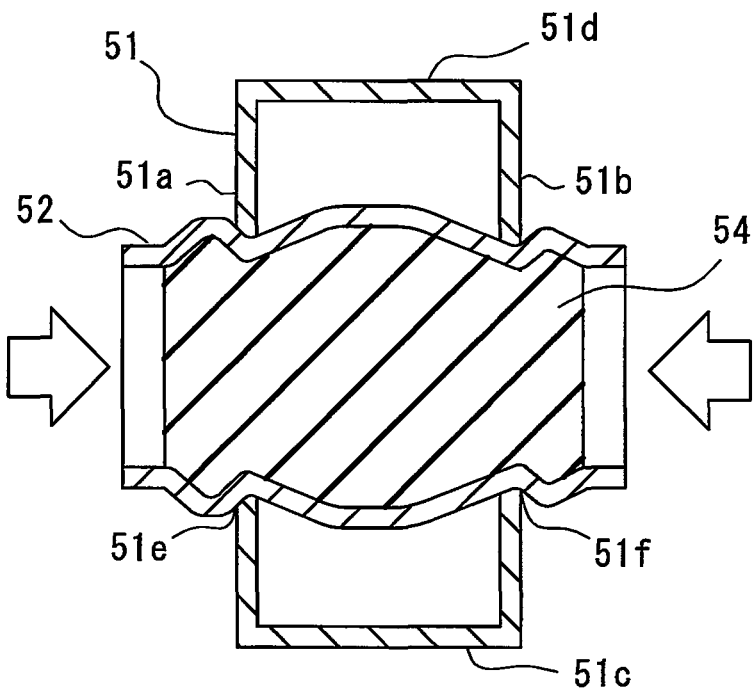
FIG. 6C is a cross-sectional view showing a third step of the method for manufacturing the element joint according to the fifth embodiment.
Figure 6D:
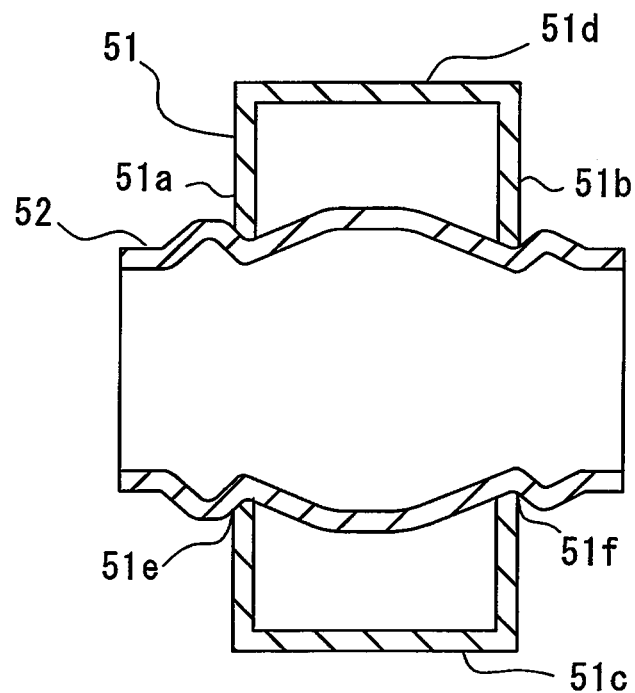
FIG. 6D is a cross-sectional view showing a fourth step of the method for manufacturing the element joint according to the fifth embodiment.
Figure 6E:
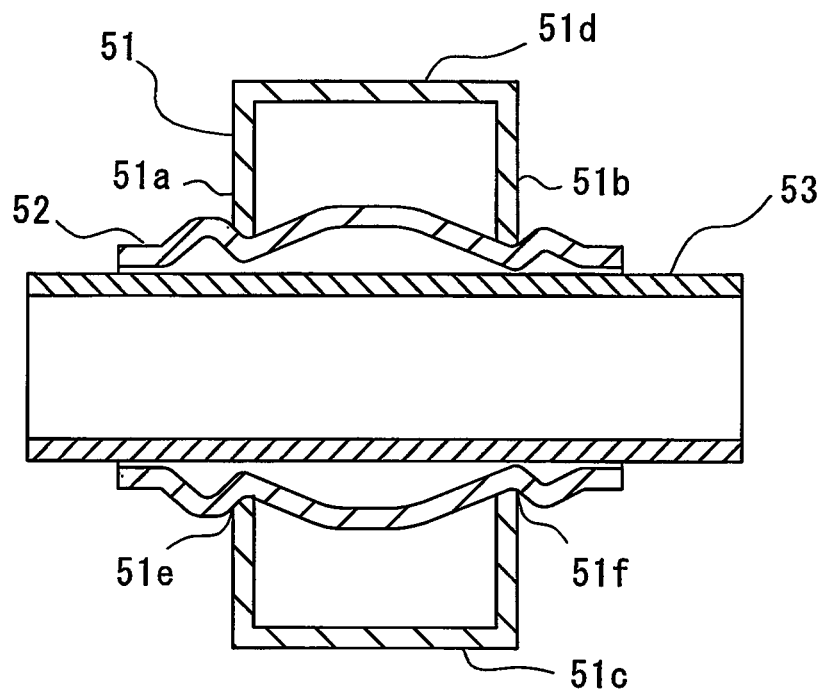
FIG. 6E is a cross-sectional view showing a fifth step of the method for manufacturing the element joint according to the fifth embodiment.
Figure 6F:
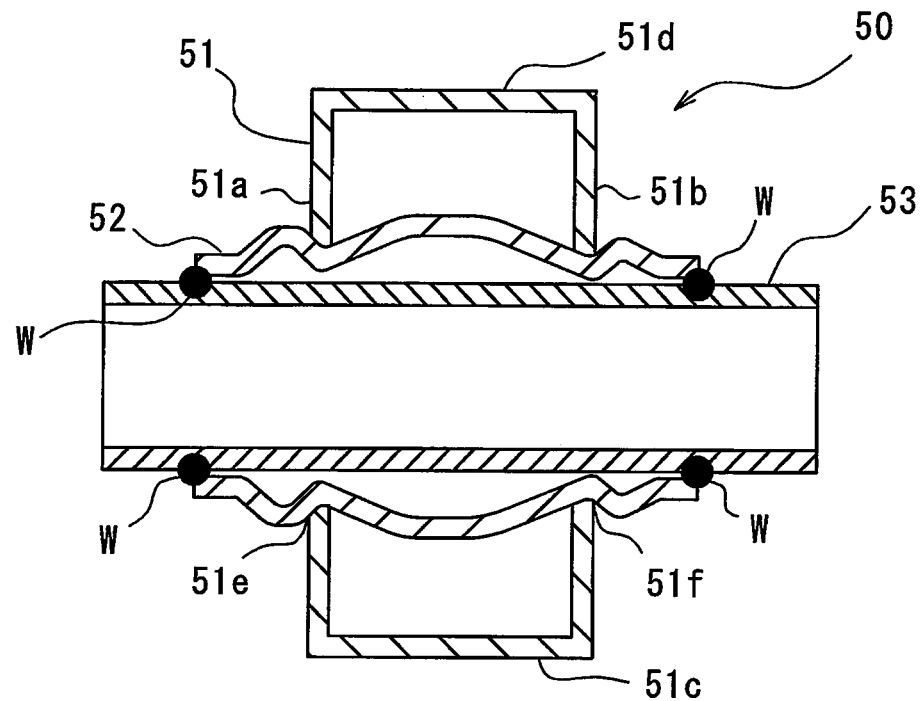
FIG. 6F is a cross-sectional view showing a sixth step of the method for manufacturing the element joint according to the fifth embodiment.

With reference to FIG. 6F, the element joint 50 of the present embodiment is obtained by joining a box body (first member) 51 made of a quality of material with the lowest strength, a short pipe (second member) 52 made of a quality of material with intermediate strength, and a long pipe (third member) 53 made of a quality of material with the highest strength.

The box body 51 has two pairs of plate-shaped opposite side walls (51a, 51b) and (51c, 51d). Of them, in one pair of side walls 51a and 51b, hole portions 51e and 51f are provided, respectively. The box body 51 is made of, for example, an aluminum alloy. The tensile strength of the aluminum alloy is about 400 MPa or less.

The short pipe 52 has a circular-pipe shape having a large diameter and a short length to the extent that the long pipe 53 can be inserted. That is, the entire short pipe 52 is a pipe-shaped portion. The short pipe 52 is made of, for example, mild steel or high tension steel. The tensile strength of mild steel and high tension steel is about 400 to 1000 MPa.

The long pipe 53 has a circular-pipe shape thinner and longer than the short pipe 52. That is, the entire long pipe 53 is a pipe-shaped portion. The long pipe 53 is made of, for example, ultra-high tension steel. The tensile strength of ultra-high tension steel is about 1000 to 1700 MPa or less.

In the element joint 50 of the present embodiment, the short pipe 52 is inserted into the respective hole portions 51e and 51f of the one pair of side walls 51a and 51b of the box body 51, and is pipe-expanded with respect to the respective hole portions 51e and 51f and joined to the box body 51 by press-fitting. In addition, the long pipe 53 is inserted into the short pipe 52 and is welded to the end portion of the short pipe 52. Welding is performed circumferentially along the edge of the end portion of the short pipe 52 (see reference numeral W). It should be noted that similarly to the first embodiment, a metallurgical joining method or a mechanical joining method other than welding may be adopted.

A method for manufacturing the element joint 50 described above will be described with reference to FIGS. 6A to 6F.

With reference to FIG. 6A, the short pipe 52 is inserted into the respective hole portions 51e and 51f of the one pair of side walls 51a and 51b of the box body 51.

With reference to FIG. 6B, a columnar rubber member (elastic body) 54 is inserted into the long pipe 53.

Any one of the step shown in FIG. 6A and the step shown in FIG. 6B may be executed first.

With reference to FIG. 6C, the rubber member 54 is compressed in the longitudinal direction of the short pipe 52 and expanded radially outward from the short pipe 52, whereby the short pipe 52 is pipe-expanded radially outward and joined to the box body 51 by press-fitting. At this time, the short pipe 52 is joined by press-fitting, at the respective hole portions 51e and 51f.

With reference to FIG. 6D, removal of the compressive load on the rubber member 54 restores the rubber member 54 to its natural state (original columnar shape). At this time, the short pipe 52 is plastically deformed and its shape is maintained. Therefore, the rubber member 54 can be easily removed from the short pipe 52.

With reference to FIG. 6E, the long pipe 53 is inserted into the short pipe 52. Preferably, when viewed from the longitudinal direction of the long pipe 53, both end portions of the long pipe 53 and the short pipe 52 are arranged without gaps so that they can be easily welded later.

With reference to FIG. 6F, the short pipe 52 and the long pipe 53 are welded. Welding is performed circumferentially along the edges of both end portions of the short pipe 52 (see reference numeral W). However, it is not always necessary to weld circumferentially.

In this way, the element joint 50 of the present embodiment is manufactured as shown in FIG. 6F.

The action and effect of the present embodiment are the same as those of the first embodiment.

Sixth Embodiment

FIGS. 7A to 7F show a method for manufacturing the element joint 60 of the present embodiment correspondingly to FIGS. 2A to 2F of the first embodiment. In the present embodiment, the description of substantially the same parts as in the first embodiment may be omitted.

Figure 7A:
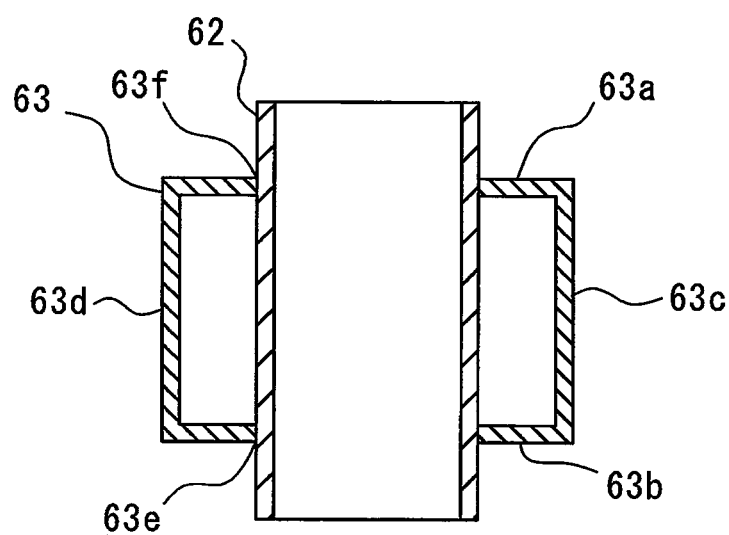
FIG. 7A is a cross-sectional view showing a first step of a method for manufacturing an element joint according to a sixth embodiment.
Figure 7B:
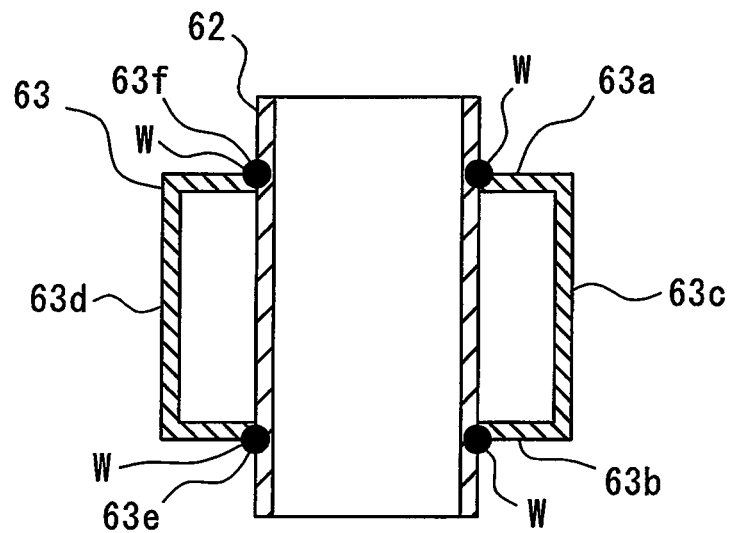
FIG. 7B is a cross-sectional view showing a second step of the method for manufacturing the element joint according to the sixth embodiment.
Figure 7C:
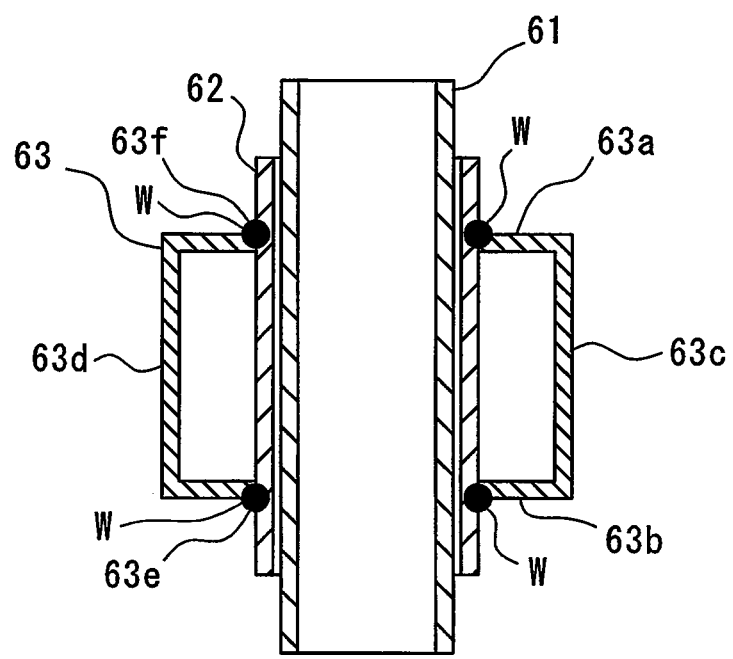
FIG. 7C is a cross-sectional view showing a third step of the method for manufacturing the element joint according to the sixth embodiment.
Figure 7D:
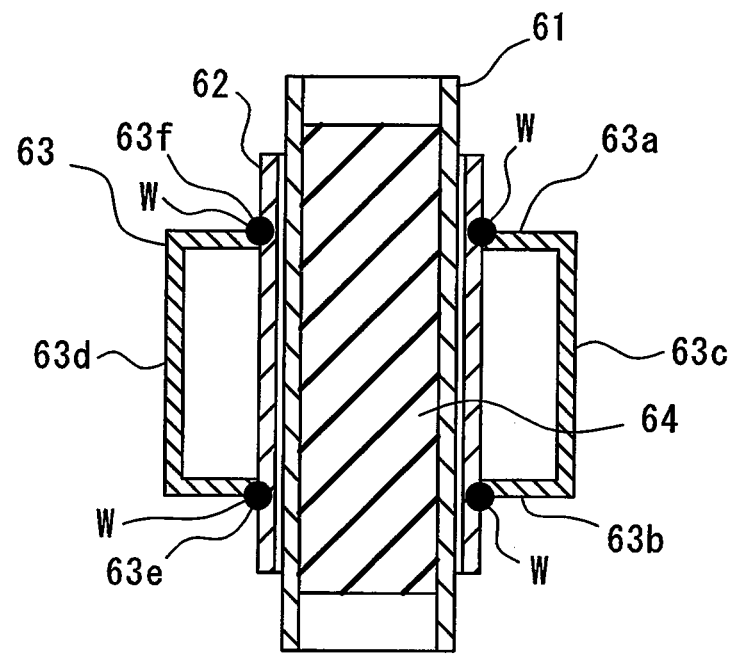
FIG. 7D is a cross-sectional view showing a fourth step of the method for manufacturing the element joint according to the sixth embodiment.
Figure 7E:
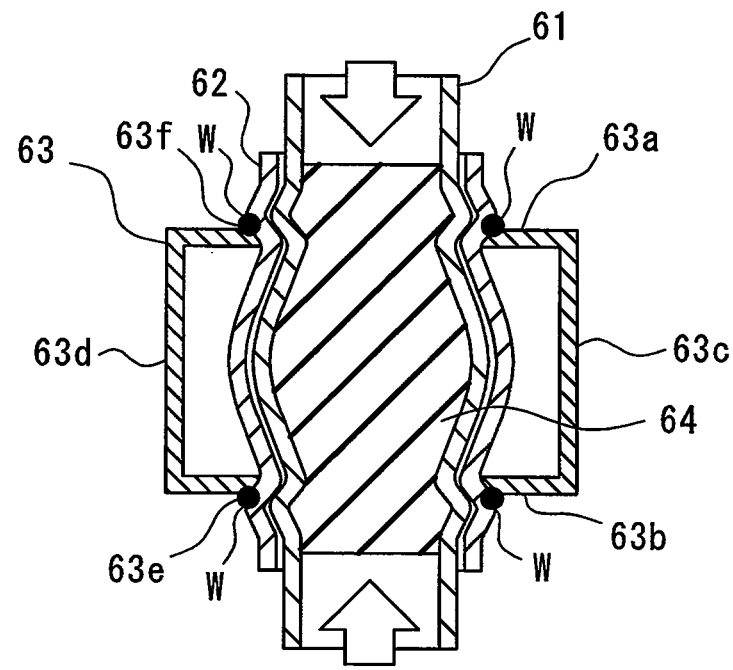
FIG. 7E is a cross-sectional view showing a fifth step of the method for manufacturing the element joint according to the sixth embodiment.
Figure 7F:
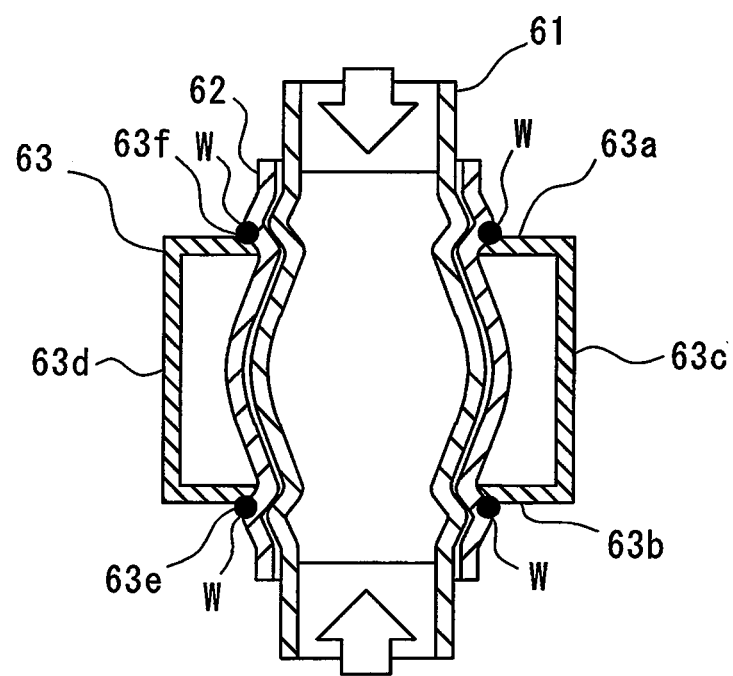
FIG. 7F is a cross-sectional view showing a sixth step of the method for manufacturing the element joint according to the sixth embodiment.

With reference to FIG. 7F, the element joint 60 of the present embodiment is obtained by joining a long pipe (first member) 61 made of a quality of material with the lowest strength, a short pipe (second member) 62 made of a quality of material with intermediate strength, and a box body (third member) 63 made of a quality of material with the highest strength.

The long pipe 61 has a circular-pipe shape thinner and longer than the short pipe 62. That is, the entire long pipe 61 is a pipe-shaped portion. The long pipe 61 is made of, for example, an aluminum alloy. The tensile strength of the aluminum alloy is about 400 MPa or less.

The short pipe 62 has a circular-pipe shape having a large diameter and a short length to the extent that the long pipe 61 can be inserted. That is, the entire short pipe 62 is a pipe-shaped portion. The short pipe 62 is made of, for example, mild steel or high tension steel. The tensile strength of mild steel and high tension steel is about 400 to 1000 MPa.

The box body 63 has two pairs of plate-shaped opposite side walls (63a, 63b) and (63c, 63d). Of them, in one pair of side walls 63a and 63b, hole portions 63e and 63f are provided, respectively. The box body 63 is made of, for example, ultra-high tension steel. The tensile strength of ultra-high tension steel is about 1000 to 1700 MPa or less.

In the element joint 60 of the present embodiment, the short pipe 62 is inserted into the respective hole portions 63e and 63f of the one pair of side walls 63a and 63b of the box body 63, and is welded to the box body 63 at the respective hole portions 63e and 63f (see reference numeral W). Welding is performed circumferentially along the edges of the hole portions 63e and 63f. It should be noted that similarly to the first embodiment, a metallurgical joining method or a mechanical joining method other than welding may be adopted. In addition, the long pipe 61 is inserted into the short pipe 62, is pipe-expanded with respect to the respective hole portions 63e and 63f of the one pair of side walls 63a and 63b, and is joined to the short pipe 62 by press-fitting.

A method for manufacturing the element joint 60 described above will be described with reference to FIGS. 7A to 7F.

With reference to FIG. 7A, the short pipe 62 is inserted into the respective hole portions 63e and 63f of the one pair of side walls 63a and 63b of the box body 63.

With reference to FIG. 7B, the short pipe 62 and the box body 63 are welded. Welding is performed circumferentially along the edges of the respective hole portions 63e and 63f of the one pair of side walls 63a and 63b of the box body 63. However, it is not always necessary to weld circumferentially.

With reference to FIG. 7C, the long pipe 61 is inserted into the short pipe 62.

With reference to FIG. 7D, a columnar rubber member (elastic body) 64 is inserted into the long pipe 61.

Any one of the step shown in FIG. 7C and the step shown in FIG. 7D may be executed first.

With reference to FIG. 7E, the rubber member 64 is compressed in the longitudinal direction of the long pipe 61 and expanded radially outward from the long pipe 61, whereby the long pipe 61 is pipe-expanded radially outward and joined to the short pipe 62 by press-fitting. At this time, the short pipe 62 may be plastically deformed together with the long pipe 61.

With reference to FIG. 7F, removal of the compressive load on the rubber member 64 restores the rubber member 64 to its natural state (original columnar shape). At this time, the long pipe 61 (and the short pipe 62) is plastically deformed and the shape is maintained. Therefore, the rubber member 64 can be easily removed from the long pipe 61.

In this way, the element joint 60 of the present embodiment is manufactured as shown in FIG. 7F.

The action and effect of the present embodiment are the same as those of the first embodiment.

As described above, although the specific embodiments and their modifications of the present invention are described, the present invention is not limited to the above-described embodiments, and can be implemented with various modifications within the scope of the present invention. For example, an appropriate combination of contents of the individual embodiments may be one embodiment of the present invention.

Figure 8:
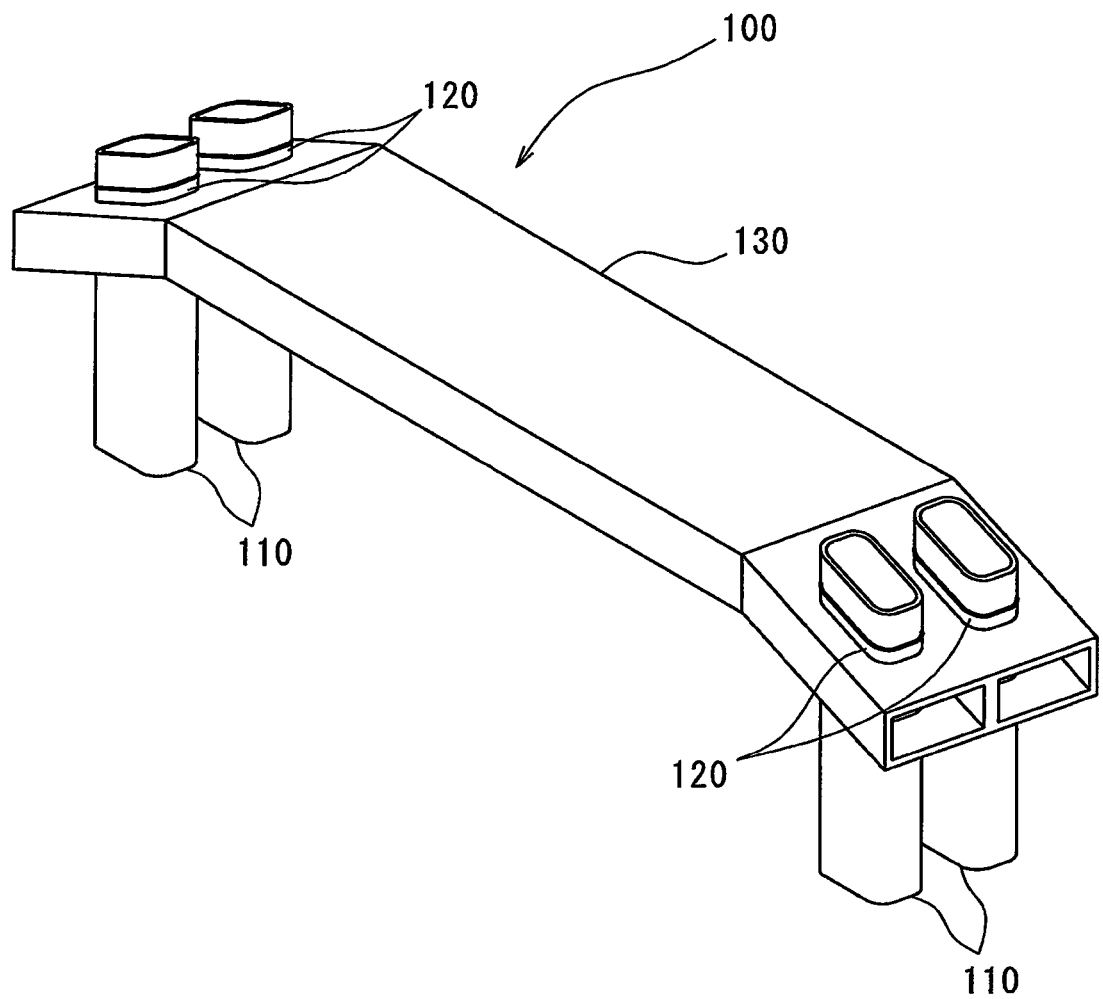
FIG. 8 is perspective view of a bumper system.
Figure 9:
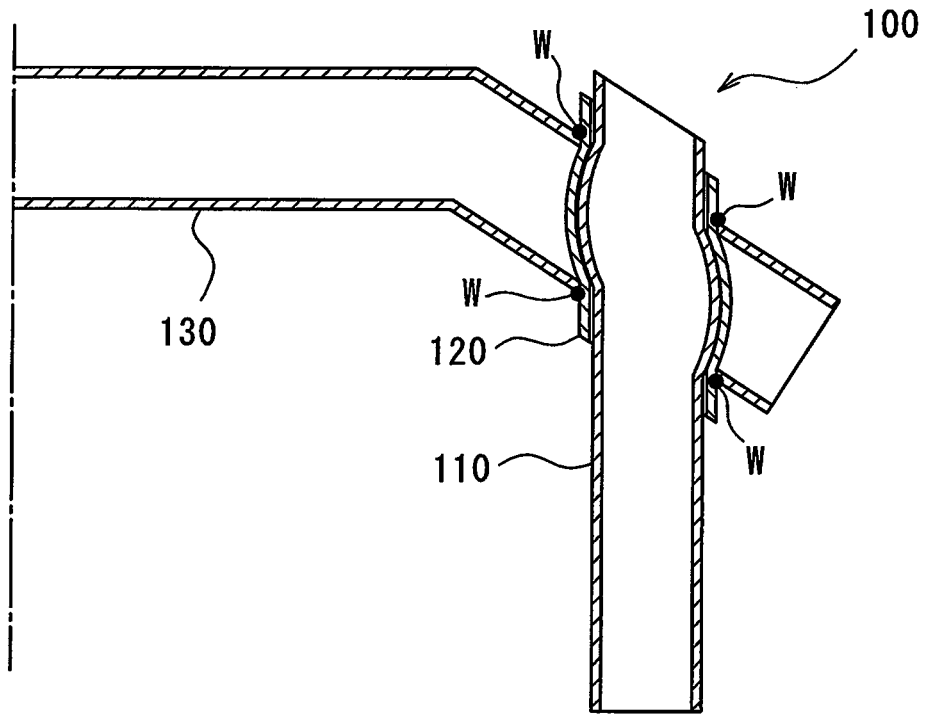
FIG. 9 is a cross-sectional view of the bumper system.

In addition, the application target of the element joint of each of the above embodiments may be the bumper system 100 shown in FIGS. 8 and 9. For example, a bumper stay (first member) 110 made of an aluminum alloy may be joined to a bumper beam (third member) 130 made of ultra-high tension steel via a pipe-shaped intermediate member (second member) 120 made of mild steel or high tension steel. In the bumper system 100, the bumper stay 110 is inserted into the intermediate member 120, and the bumper stay 110 is pipe-expanded and joined to the intermediate member 120 by press-fitting. In addition, the intermediate member 120 and the bumper beam 130 are welded at both end portions of the intermediate member 120 (see reference numeral W).

Figure 10:
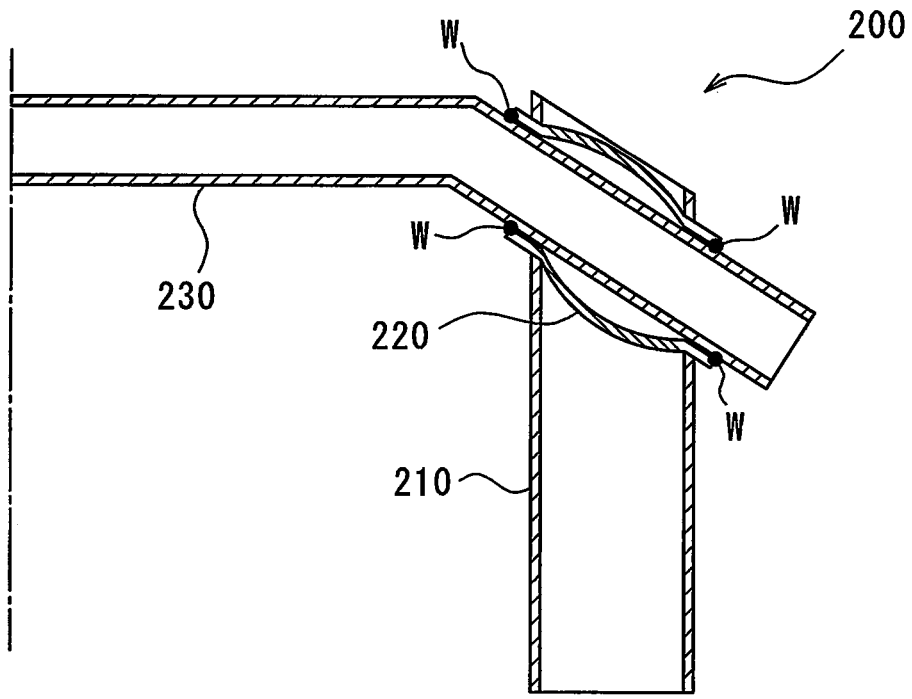
FIG. 10 is a cross-sectional view of a modified example of the bumper system.

As shown in FIG. 10, in the bumper system 200 of a modified example, the intermediate member (second member) 220 and the bumper beam (third member) 230 penetrate the bumper stay (first member) 210. The intermediate member 220 is pipe-expanded to be joined to the bumper stay 210 by press-fitting and welded to the bumper beam 230 at both end portions (see reference numeral W). At this time, the bumper

The invention claimed is:

1. A method for manufacturing an element joint by joining a first member, a second member made of a quality of material having a strength higher than a strength of the first member, and a third member made of a quality of material having a strength higher than the strength of the second member, the method comprising: preparing the first member and the second member at least one of which includes a pipe-shaped portion, and the third member; pipe-expanding the pipe-shaped portion to join the pipe-shaped portion to the other member by press-fitting; and joining the second member and the third member to each other by a metallurgical joining method, wherein the third member is a radially outermost member and positioned longitudinally centrally on the outwardly most bulging portion of the first and second members, the third member has a first outer surface and a second outer surface longitudinally opposite the first outer surface, the outwardly most bulging portion of the first and second members curves longitudinally past and away from the first and second outer surfaces, respectively, of the third member when viewed in cross-section, and the second member's entire inner surface and outer surface bulging radially outward.

2. The method for manufacturing an element joint according to claim 1, wherein the joining by press-fitting includes:
inserting an elastic body into the pipe-shaped portion; and
compressing the elastic body in a longitudinal direction of the pipe-shaped portion to expand the elastic body radially outward from the pipe-shaped portion to pipe-expand the pipe-shaped portion radially outward to join the pipe-shaped portion to the other member by press-fitting.

3. A method for manufacturing an element joint by joining a first member, a second member made of a quality of material having a strength equal to or higher than a strength of the first member, and a third member made of a quality of material having a strength equal to or higher than the strength of the second member, the method comprising: preparing the first member and the second member at least one of which includes a pipe-shaped portion, and the third member; pipe-expanding the pipe-shaped portion to join the pipe-shaped portion to the other member by press-fitting; and joining the second member and the third member to each other by a metallurgical joining method, wherein the third member has a plate shape, the third member is a radially outermost member and positioned longitudinally centrally on the outwardly most bulging portion of the first and second members, the third member has a first outer surface and a second outer surface longitudinally opposite the first outer surface, the outwardly most bulging portion of the first and second members curves longitudinally past and away from the first and second outer surfaces, respectively, of the third member when viewed in cross-section, and the second member's entire inner surface and outer surface bulging radially outward.

* * * * *